(12) United States Patent    (10) Patent No.:   US 8,515,711 B2
Mitchell et al.    (45) Date of Patent:   Aug. 20, 2013

(54) DIAGNOSTIC SYSTEM AND METHOD FOR MONITORING OPERATING CONDITIONS OF COMPONENTS OF A TURBINE MACHINE

(75) Inventors: David J. Mitchell, Oviedo, FL (US); Ramesh Subramanian, Oviedo, FL (US); Nancy H. Ulerich, Longwood, FL (US); Paul J. Zombo, Cocoa, FL (US)

(73) Assignee: Siemens Energy, Inc., Orlando, FL (US)

( * ) Notice: Subject to any disclaimer, the term of this patent is extended or adjusted under 35 U.S.C. 154(b) by 450 days.

(21) Appl. No.: 12/909,194

(22) Filed: Oct. 21, 2010

(65) Prior Publication Data

US 2012/0101775 A1   Apr. 26, 2012

(51) Int. Cl.
*G06F 11/30* (2006.01)
*G06F 11/00* (2006.01)

(52) U.S. Cl.
USPC ............ 702/183; 702/116; 702/187; 702/188

(58) Field of Classification Search
USPC ..................... 702/183–190, 33, 116, 121–123
See application file for complete search history.

(56) References Cited

U.S. PATENT DOCUMENTS

| | | | |
|---|---|---|---|
| 4,859,079 A | 8/1989 | Wickersheim et al. | |
| 5,386,117 A | 1/1995 | Piety et al. | |
| 5,822,450 A | 10/1998 | Arakawa et al. | |
| 6,037,581 A | 3/2000 | Zorner | |
| 6,062,811 A | 5/2000 | Zombo et al. | |
| 6,200,088 B1 | 3/2001 | Zombo et al. | |
| 6,364,524 B1 | 4/2002 | Markham | |
| 6,661,222 B1 | 12/2003 | Twerdochlib | |
| 6,838,157 B2 | 1/2005 | Subramanian | |
| 7,167,814 B2 | 1/2007 | Lindberg et al. | |
| 7,388,980 B2 | 6/2008 | Vaidyanathan | |
| 7,428,842 B2 | 9/2008 | Fair et al. | |
| 7,561,200 B2 * | 7/2009 | Garvey et al. ............ | 348/333.01 |
| 2008/0088824 A1 | 4/2008 | McMillan | |
| 2008/0177485 A1 * | 7/2008 | Cohen et al. .................... | 702/56 |
| 2009/0154293 A1 | 6/2009 | Sengupta et al. | |
| 2009/0310815 A1 | 12/2009 | Chiakpo et al. | |
| 2010/0117859 A1 | 5/2010 | Mitchell et al. | |

FOREIGN PATENT DOCUMENTS

EP            2211139 A1    7/2010

\* cited by examiner

*Primary Examiner* — Phuong Huynh

(57) ABSTRACT

A diagnostic system and method for monitoring operating conditions of turbine machine components (18, 19, 22, 23) that comprise one or more non-contact sensors (24, 31) that detect an operating condition of a turbine component (18, 19, 22, 23) over a defined region of the component. In addition, point sensors (50) are provided that detect and monitor the same operating condition within the defined region. Data generated from the point sensor (50) is used to calibrate the non-contact sensor (24, 31) and the data generated by the non-contact sensor (24, 31).

24 Claims, 3 Drawing Sheets

DIAGNOSTIC SYSTEM AND METHOD FOR MONITORING OPERATING CONDITIONS OF COMPONENTS OF A TURBINE MACHINE

FIELD OF THE INVENTION

The present invention relates generally to monitoring operating environments of a turbine and, in particular, to monitoring operating conditions of components that are enabled for transmitting data with respect to the condition of individual components. In addition, the present invention relates to the use of non-intrusive measurement systems for monitoring operating conditions of components of a turbine machine

BACKGROUND OF THE INVENTION

Gas combustion turbines are used for a variety of applications such as driving an electric generator in a power generating plant or propelling a ship or an aircraft. Firing temperatures in modern gas turbine engines continue to increase in response to the demand for higher efficiency engines. Superalloy materials have been developed to withstand the corrosive high temperature environment that exists within a gas turbine engine. However, even superalloy materials are not able to withstand extended exposure to the hot combustion gas of a current generation gas turbine engine without some form of cooling and/or thermal insulation.

Thermal barrier coatings are widely used for protecting various hot gas path components of a gas turbine engine. The reliability of such coatings is critical to the overall reliability of the machine. The design limits of such coatings are primarily determined by laboratory data. However, validation of thermal barrier coating behavior when subjected to the stresses and temperatures of the actual gas turbine environment is essential for a better understanding of the coating limitations. Such real world operating environment data is very difficult to obtain, particularly for components that move during the operation of the engine, such as the rotating blades of the turbine.

Despite the extreme sophistication of modern turbine engines, such as gas turbines for generating electrical power or aircraft engines for commercial and military use, designers and operators have very little information regarding the internal status of the turbine engine components during operation. This is due to the harsh operating conditions, which have prevented the use of traditional sensors for collecting reliable information of critical engine components.

The ongoing quest to increase gas turbine efficiency through improved fuel efficiency and performance (increased thrust), requires increased engine operating temperatures of the turbine engines. While improved engine design and usage of materials with high temperature capabilities provide solutions for fuel efficiency and performance, reliability issues remain. The materials exposed to the hot gas path are being operated more closely to their design margins and, hence, necessitates verification of design models and development of materials prognosis.

The turbine engine is comprised of a wide range of component materials with varied exposure temperatures, failure modes and usage. Also, the gas-turbine environment is characterized by high temperatures, high centripetal accelerations on rotating elements, and is often surrounded by highly conductive metallic materials. This complicates the introduction of sensors to monitor the real-time condition of the components, including critical elements such as rotating disks and blades. Current state of the art processes for obtaining design data from rotating components, such as rotating blades, involves modifying disks and rotors in order to route the lead wires from the blades to slip rings or telemetry systems located at the end of the rotor, which has lower temperature and centrifugal loads than the blade. Disks and rotors are expensive and long lead time turbine components. The modifications can often lead to reductions in rotor life of several orders of magnitude. Changing a rotor costs millions of dollars, and requires that a turbine engine be fully disassembled, requiring an outage that may be more than a month long. A power company will typically lose about one million dollars per day when a turbine is not generating electricity. For this reason, long outages are not desirable.

Surface mapping techniques, such as infrared and microwave interrogation techniques, may be used to obtain real time information from rotating components in compressor and turbine sections of the turbine without the need to modify disks and rotors. For example, infrared cameras may be used to acquire temperature mapping data of various components including rotating blades and stationary vanes. In addition, non-intrusive stress measurement systems, also known as blade tip-timing measurement, provide interrogation techniques for measuring deflection or vibrational modes of rotating blades using electromagnetic radiation, often infrared or microwave. However, without local calibration, the sensitivity and accuracy of such surface measurement techniques is not sufficient.

Wireless telemetry systems, including point sensors mounted directly on a turbine component, may provide more accurate measurement of component temperature and vibrations. However, such systems provide information for only the point location where they reside, and only for the component on which they are located. Embodiments of the invention disclosed and claimed herein may comprise a diagnostic system that combines the high fidelity data obtained by the point sensors with the broad area data associated with the same components and obtained simultaneously by surface measurement techniques. Calibration of the surface measurement techniques via point sensors located in the field of view on the same components may result in high fidelity data being obtained from a large surface area of the turbine components. The data retrieved from turbine components with such wireless point sensors has not previously been combined with that obtained via non-intrusive diagnostic equipment in order to provide more accurate surface mapping techniques.

DETAILED DESCRIPTION OF THE INVENTION

Figure 1:
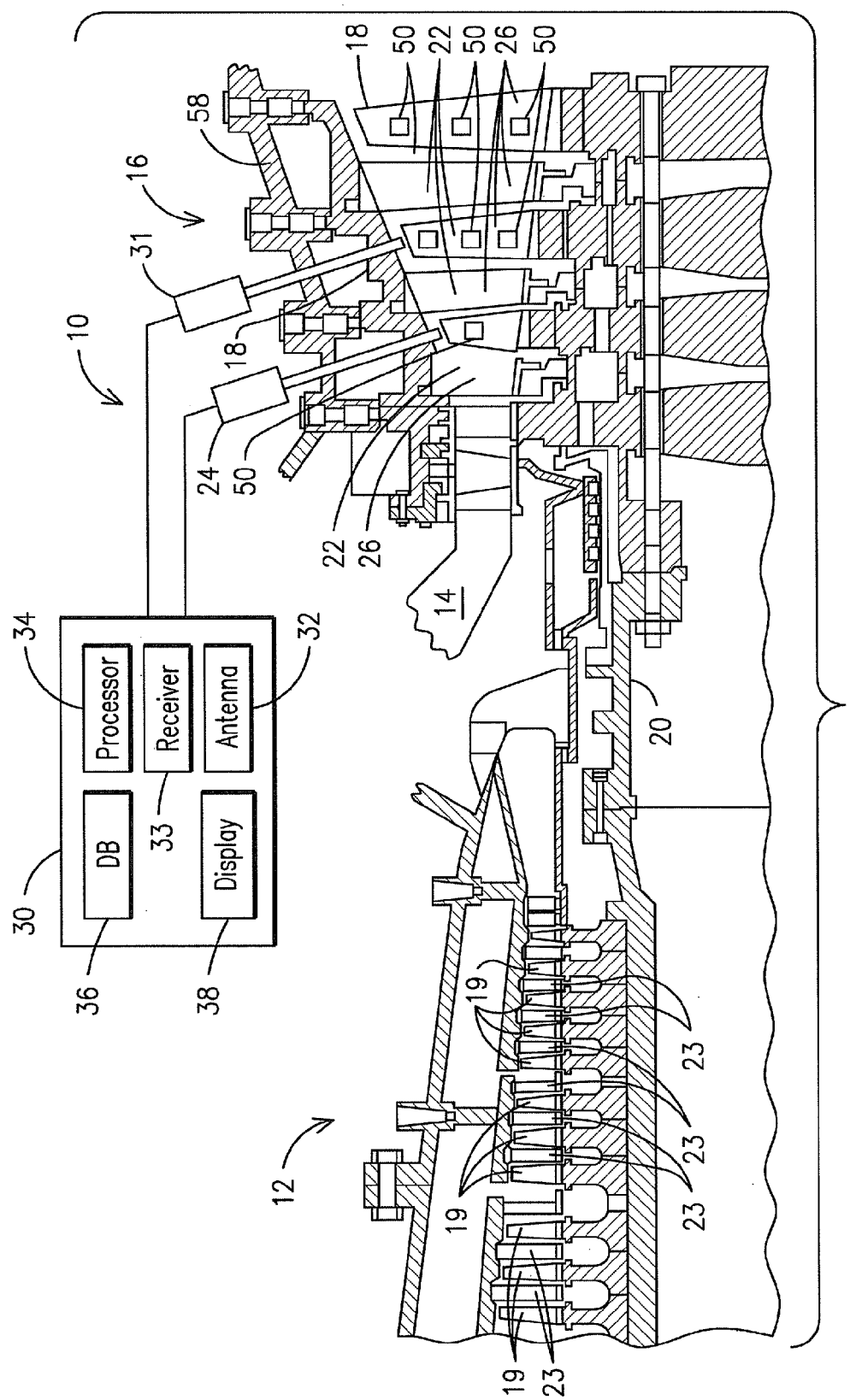
FIG. 1 is a cross sectional view of an exemplary combustion turbine with which embodiments of the invention may be used and an exemplary monitoring and control system for collecting and analyzing component data from the combustion turbine.

FIG. 1 illustrates an exemplary combustion turbine 10 such as a gas turbine used for generating electricity incorporating non-contact sensors and point sensors placed at various positions to monitor operating conditions of stationary and moving components of the turbine machine 10 for diagnosing performance of these various components. Embodiments of the invention may be used with a combustion turbine 10 or in numerous other operating environments and for various purposes as will be recognized by those skilled in the art. For example, embodiments may be used in aircraft engines and in the automotive industry for monitoring various operating conditions of stationary and moving components. As will be explained in more detail below, the sensors may be used to monitor temperature configurations, vibrational modes (bending, twisting, elongation, etc.), strain, acceleration, gas content of fluid flowing across or over such components and various other operating conditions. For purposes of describing the embodiments of the claimed and disclosed invention, reference may be made to monitoring or measuring temperature and vibrational modes of components; however, one skilled in the art will appreciate that embodiments of the invention may be used to monitor other operating conditions.

Returning to FIG. 1, combustion turbine engine 10 includes a compressor 12, at least one combustor 14 (broken away) and a turbine 16. Compressor 12, combustor 14 and turbine 16 are sometimes referred to collectively as a gas or combustion turbine engine or turbine machine. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel- or cobalt-based alloys, and may be coated with a thermal barrier coating 26, such as yttria-stabilized zirconia. Similarly, compressor 12 includes a plurality of rotating blades 19 positioned between respective vanes 23.

In use, air is drawn in through compressor 12, where it is compressed and driven towards combustor 14. Combustor 14 mixes the air with fuel and ignites it thereby forming a working gas. This working gas will typically be above about 1300° C. This gas expands through turbine 16, being guided across blades 18 by vanes 22. As the gas passes through turbine 16, it rotates blades 18 and rotor shaft 20, thereby transmitting usable mechanical work through shaft 20. Combustion turbine 10 may also include a cooling system (not shown), dimensioned and configured to supply a coolant, for example, steam or compressed air, to blades 18 and vanes 22.

The environment wherein blades 18, 19 and vanes 22, 23 operate is particularly harsh, being subject to high operating temperatures and corrosive atmosphere, which may result in serious deterioration of blades 18, 19 and vanes 22, 23. This is especially likely if the thermal barrier coating 26 should spall or otherwise deteriorate. In addition, components such as the blades 18 may rotate at rates as high as 3,600 rpm subjecting the blades to vibrations, twisting, elongation and various other mechanical stresses.

Embodiments of the invention are advantageous because they allow components to be configured for transmitting data indicative of a component's condition during operation of combustion turbine 10. Blades 18, 19, vanes 22, 23, and coatings 26, for example, may be configured with point sensors 50 for transmitting component specific data that may be directly monitored to determine the respective condition of each component during operation and to develop predictive maintenance schedules. As explained in more detail below, the blades 18, 19, vanes 22, 23 and coatings 26 may be equipped with point sensors that detect certain operating conditions of the components. In addition, the turbine machine 10 may be equipped with a non-intrusive measurement system that includes non-contact sensors 24 and 31 that also measure or monitor the operating conditions of the same turbine machine components as those monitored by the point sensors 50. As described below, the point sensors 50 may be used to provide real-time calibration for the non-contact sensors 24 and 31. For purposes of describing embodiments of the invention, reference is made to monitoring operating conditions of turbine vanes and blades; however, other turbine components such as combustion baskets, combustion nozzles, transition components (such as ducts) and/or ring segments may be similarly monitored.

FIG. 1 also illustrates a schematic of an exemplary monitoring and data acquisition system 30 that may be used in accordance with various aspects of the present invention. System 30 may include an antenna 32, a receiver 33, a processor or CPU 34, a database 36 and a display 38. Processor 34, database 36 and display 38 may be conventional components and antenna 32 and receiver 33 may have performance specifications that are a function of various embodiments of the invention. For example, antenna 32 and receiver 33 may be selected for receiving wireless telemetry data transmitted from a plurality of transmitters deployed in various locations throughout combustion turbine 10 as more fully described below.

Embodiments of the present invention allow for a plurality of sensors to be embedded within the respective coatings of a plurality of components within combustion turbine 10. Alternate embodiments allow for the sensors to be surface mounted or deposited on components, especially those contained in areas where components do not require a barrier coating, such as within compressor 12. Exemplary sensor embodiments may be used to communicate data to system 30 with respect to physical, performance or operating characteristics of a component and/or properties of a component's coating as well as operating parameters of combustion turbine engine 10. The present invention also comprises the above-mentioned non-contact sensors 24 and 31 that are generally positioned in spaced relation to components and detect or measure an operating condition over a defined region or surface area of the component. Both the embedded or surface mounted sensors (also referred to as "point sensors") and the non-contact sensors are linked to the acquisition system 30 for transmission of data or data signals indicative operating condition measurements.

For example, exemplary point sensors and non-contact sensors may be used to detect surface temperature of a component, measure content or concentration of gases in a combustion gas flow across a component's coating, measure strain across an area of a component, measure vibrations or deflections (bending, twisting, elongation) of a component or determine crack formation within a component or coating. Those skilled in the art will recognize other properties and/or characteristics of a component or component coating that may be measured and/or detected in accordance with aspects of the invention.

It will be appreciated that aspects of the invention allow for various sensor configurations to be embedded within a barrier coating such as a barrier coating 26 of blades 18 or vanes 22 of turbine 16. U.S. Pat. No. 6,838,157, which is specifically incorporated herein by reference, describes various embodiments of methods for instrumenting gas turbine components, such as blades 18 and vanes 22 that may be utilized for depositing sensors in accordance with aspects of the present invention. This patent discloses various methods of forming trenches in a barrier coating, forming a sensor in the coating and depositing a backfill material in the trench over the coating. Embodiments of those methods and components may be used to form smart components as disclosed herein.

U.S. Pat. No. 6,576,861, which is specifically incorporated herein by reference, discloses a method and apparatus that may be used to deposit embodiments of sensors and sensor connectors with transmitters in accordance with aspects of the present invention. In this respect, methods and apparatus disclosed therein may be used for the patterning of fine sensor and/or connector features of between about 100 microns and 500 microns without the need of using masks. Depositing features using conductive materials, resistive materials, dielectric materials, insulative materials and other application specific materials may form multilayer electrical circuits and sensors. It will be appreciated that other methods may be used to deposit multilayer electrical circuits and sensors in accordance with aspects of the invention. For example, thermal spraying, vapor deposition, laser sintering and curing deposits of material sprayed at lower temperatures may be used as well as other suitable techniques recognized by those skilled in the art.

Figure 3:
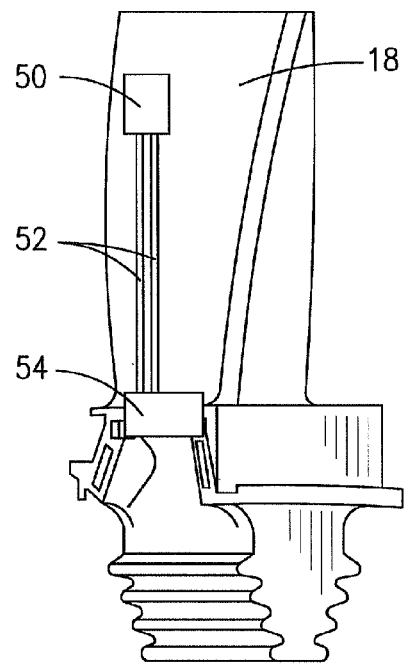
FIG. 3 is a schematic illustration of a turbine blade having mounted thereon a wireless telemetry point sensor.

Embodiments of the invention allow for a plurality of point sensors 50 to be deployed in numerous places within combustion turbine 10 for monitoring component-specific or coating-specific conditions as well as collecting other data with respect to the operation or performance of combustion turbine 16. For example, FIGS. 1 and 3 illustrate that one or more sensors 50 may be embedded within respective barrier coatings 26 of one or more blades 18, 19 or vanes 23 of turbine 16. It will be appreciated that sensors 50 may be embedded within barrier coatings of other components of turbine 10 for which component-specific and/or coating-specific data is to be acquired.

FIG. 3 illustrates a schematic plan view of a blade 18 having an exemplary sensor 50 connected therewith and connector 52 connecting sensor 50 with transmitter 54. Transmitter 54 may be powered via inducing power using electromagnetic radiation and corresponding transformers or harvesting the engine's natural energy, from sources such as heat or vibration, within turbine 16 during operation of combustion turbine 10. For example, transmitter 54 may be located remotely from blade 18 such as within a disk (not shown) to which a plurality of blades 18 is attached. In this respect, transmitter 54 may be maintained in a cooler location outside the hot gas path, which will enable functionality of the circuits required for wireless transmission. Locating transmitter 54 remote from blade 18 allows for using an external power source for powering transmitter 54 rather than using a battery or induction. A power supply may also be attached to sensor 50 to provide additional functionality to the sensor 50. This additional functionality could include mechanical actuation as a result of feedback responsive to output from sensor 50. Such an integrated system may be applicable for components, such as ring segments for real-time gap control.

In other alternate embodiments a coating may be deposited onto a surface of vane 23, a trench may be formed within the coating and sensor 50 and connector 52 may be deposited within the trench. A protective coating may be deposited over sensor 50 and/or connector 52. Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23. One or more sensors 50, such as strain gauges or thermocouples, for example, may be deposited on one or more turbine or compressor blades 18, 19.

The above described instrumented components such as vanes 22, 23 and blades 18, 19 including the sensors 50, and various embodiments of such instrumented components are described in more detail in co-pending U.S. application Ser. No. 11/521,175, the entirety of which in incorporated herein by reference.

Embodiments of the present invention allow for the data acquisition system 30 to collect and store historical data with respect to various operating conditions of combustion turbine 10. This may be accomplished by continuously interrogating turbine 16 or compressor 12 conditions, for example, by the deposition of piezoelectric devices and/or other sensors 50 configured for providing a continuous data stream indicative of the loading conditions and stresses, vibration frequency and temperatures experienced by various components within turbine 16 or compressor 12. This data may be correlated to data indicative of a component's wear and used for predictive maintenance or other corrective actions.

Figure 2:
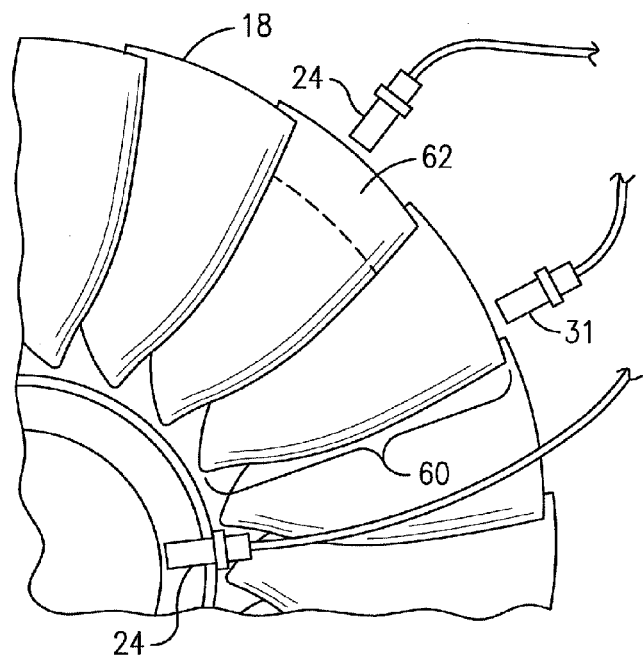
FIG. 2 is a schematic illustration of a turbine blade stage and non-contact sensors positioned for detecting an operating condition of the turbine blades.

Again referring to FIG. 1 and in reference to FIG. 2 there is shown a non-intrusive measurement system including non-contact sensors 24 and 31 that are mounted to the casing 58 of the turbine machine 10 and are positioned relative to a working component such as blade 18, 19 and vanes 22, 23. Such non-intrusive sensors 24, 31 may be an infrared camera that detects a surface temperature of a component, or an infrared, radio frequency, or microwave device that provides data relative to the vibrational modes of a component; however, other operating conditions may be monitored for purposes of diagnosing the condition of a turbine machine 10. As described in U.S. Pat. Nos. 6,062,811 and 6,200,088, both of which are incorporated herein by reference, such non-contact sensors provide for remote sensing capabilities that may be linked to a data acquisition system to provide an online monitoring system.

With respect to stationary or rotating components of the turbine machine 10, the non-contact sensors 24 and 31 may be configured to take measurements of a plurality of blades 18, 19 or vanes 22, 23 in a turbine or compressor stage at timed intervals and for a given resident time or time duration during which a condition measurement or data retrieval occurs. The diagnostic system may include a plurality of non-contact sensors for a respective turbine or compressor stage to monitor a plurality of different operating conditions for a respective stage. As known to those skilled in the art, non-contact sensors are typically positioned relative to rotating blades 18, 19 or stationary vanes 23 in a turbine or compressor stage so that during any time duration when the sensors 24, 31 are taking measurements a plurality of blades or vanes may be within a field of view of the sensors. In this manner, the sensors 24 and 31 may simultaneously take measurements of multiples of the same type components in a turbine or compressor stage for a given time duration.

In an embodiment, the sensors 24, 31 may take measurements of a predetermined set of blades 18, 19 or vanes 22, 23 in a given stage as representative measurement or monitoring of operating conditions of the entire stage of blades or vanes. In a given turbine stage, there may be 72 blades or vanes; and, the sensors 24, 31 may be configured to take the measurements of one or more blades in a turbine or compressor stage. Preferably the measurements are taken from four (4) to eight (8) blades 18, 19 or vanes 22, 23 per stage, and measurements are taken from the same blades or vanes each time a measurement is taken. Accordingly, at least with respect to the rotating blades 18 and 19, these measurements may be coordinated with a rotational velocity of turbine or compressor blade stage so that the sensors 24, 31 detect an operating condition of the same blade 18 or 19 or of the same multiple blades 18 or 19 within a turbine or compressor stage. As known to those skilled in the art, the radial position (also referred to as root position on the shaft) of each blade 18, 19 on the shaft 20 is known, and knowing the rotational velocity (or rotations per minute) of the shaft 20 at any given time during the operation of the compressor 12 and turbine 16, one is able to accurately predict the location of the blades 18, 19 relative to the sensors 24 and 31 so the measurements are taken from the same blades.

As the blades 18, 19 rotate through the field of view of the sensors 24, 31 the sensors detect operating conditions on both sides of the components, including the pressure side and vacuum side of the blades 18, 19. With respect to sensors 24 and 31 used for detecting operating conditions of the stationary vanes 23, multiple sensors may be used to address both sides of such components. As shown in FIG. 2, the field of view of sensors 24, 31 define a region 60, 62 on the surface of the blade 18, 19 or vane 22, 23 over which the operating condition is detected. With respect to the infrared sensors used to detect temperature this defined region may encompass an entire side of the blade 18, 19 or vane 23 as shown in FIG. 2; and, with respect to a radio frequency or microwave sensor for detecting vibrational modes the defined region may include a tip of the blade 18, 19 or vane 22, 23 as shown in FIG. 2.

Again with respect to FIG. 1, the non-contact sensors 24 and 31 are linked to the data acquisition and control system 30 to transmit signals and/or data indicative of component operating condition measurements. The sensors 24, 31 may be linked to the system 30 via electrical leads or may be equipped with wireless telemetry capabilities to transmit data to the system 30.

The system 30 includes a database 36 in which data received from the sensors 24, 31 or 50 is stored. In addition, the system includes the processor 34 that is programmed to analyze the data received from sensors 24, 31 or 50. As known, to those skilled in the art, a processor may be programmed to generate and display in real-time a surface map of the defined region 60 or 62 monitored by non-contact sensors wherein the map displays the detected operating conditions across the map. If an operating condition is detected for a plurality of blades 18 or 19, or a plurality of vanes 23, within a prescribed time duration, the processor 34 may be configured to analyze the data to assess a condition of each individual component in a turbine or compressor stage and/or an overall condition of the turbine or compressor stage. In addition, the processor 34 may consider historical data representing operating conditions over time to asses the condition of a component or a condition of the stage in which the component functions. For example, the processor may be able to diagnose risks of failures that may be associated with a particular operating condition.

The non-contact sensors 24 and 31 generate what may be characterized as large area or surface, low fidelity signals indicative of an operating condition of a component relative to high fidelity signals generated by the point sensors 50. The terms "large area" or "surface area" refer to describe a sensor that measures an operating parameter over a defined region of a component that is much larger than an area on the same component that is monitored by the point sensor 50, which is positioned within the defined region and field of view of the non-contact sensor 24 or 31. That is, the point sensors 50, given their position on the blades 18, 19 and vanes 22, 23 are able to generate signals including operating condition measurements that are small area, high accuracy data that is more accurate or closer to a true measurement of the operating condition. For example, a thermocouple sensor or a strain gauge mounted on a blade 18, 19 or vane 22, 23, may monitor area that is one quarter of an inch squared and generate more accurate condition measurements such as temperature and vibrational data relative to the data generated by the non-contact sensors 24 and 31. When taking data from an infrared camera, a reference temperature is required in order to calibrate the temperature recorded by the camera. Without calibration, the accuracy of the data can be +/−20° C., but with a calibration thermocouple in the field of view of the camera, the accuracy can be as high as +/−6° C. This is a significant improvement in temperature measurement. In an embodiment of the present invention, this high fidelity data generated by the point sensors 50 is used to calibrate the non-contact sensors 24, 31 or the data generated by the sensor 24, 31, to develop in real-time more detailed and highly accurate surface mapping analytical or diagnostic techniques.

The calibration of the non-contact sensors 24, 31, using the data retrieved from the point sensors 50 may be performed wherein a measurement taken from the non-contact sensor 24, 31 is compared to a measurement taken from a point sensor 50. In an embodiment, these two measurements preferably have the same coordinates as provided for a surface profile of the instrumented component. Alternatively, a measurement taken from point sensor 50 may be compared to a measurement taken from the non-contact sensor 24, 31 that is closest in distance to the point sensor 50 measurement. In either instance, if the measurements are not equal, or if the measurement from the non-contact sensor 24 or 31 is not within a predetermined range of the point sensor 50 measurement, the non-contact sensor 24 or 31 is calibrated to the point sensor 50 measurement.

Figure 4:
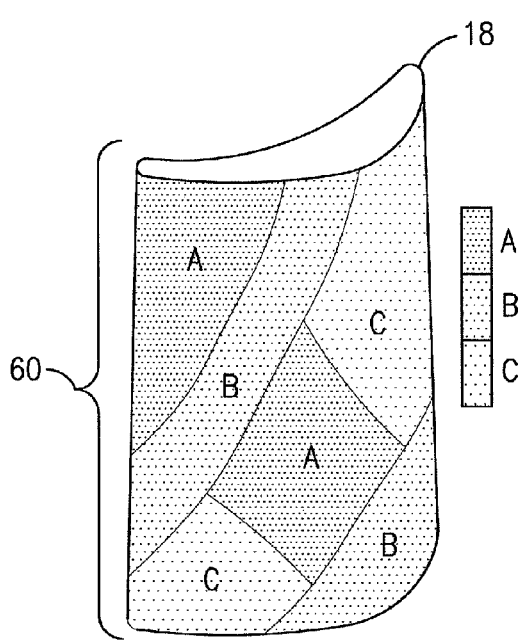
FIG. 4 is a schematic illustration of a surface data map image of a turbine component mapping the surface condition of the component. Such a map may describe variations across the blade surface of a property, such as temperature, strain, vibration frequency, gas pressure or composition.

As shown in FIG. 4, the processor 34, or other processing means that can access data stored in the data acquisition system 30 and in response to data received from the non-contact sensors 24 and 31, is able to generate data that represents a map of the surface of the component being monitored. In the case of a thermal sensor 24, the map shown in FIG. 4 is a thermal map of the defined region 60 within the field of view of the non-contact sensor 24. As shown, the map comprises color coded areas A, B and C wherein each color represents a discrete temperature measurement and/or a range of temperatures for a corresponding area on the surface of the component. As shown, FIG. 4 includes different markings/shadings representing the different colors and temperature measurements, or range of temperature measurements, as provided in the adjacent bar code 64.

For purposes of describing this invention, reference is made to a thermal map image generated from the data received from a non-contact temperature 24 sensor; however, map images may be generated from data received from other non-contact sensors such as sensor 31 that may detect vibrational modes of a turbine component.

Data relative to an airfoil profile or airfoil configuration is provided in the form of a Cartesian coordinate system that represents the airfoil profile of a vane or blade relative to a rotary axis of the shaft 20. Accordingly, for each colored area A, B or C of the mapped surface there is provided one or more X, Y and Z coordinates representing the location of an area or point within the defined region and the associated temperature measurement, or range of temperatures, for that area. Thus, the processor 34, or other processing means, is configured to associate one or more of the condition measurements (i.e., temperature measurements) mapped for a component with corresponding X, Y and Z coordinates In addition, each point sensor 50 on a component is associated with a set of X, Y and Z coordinates. In this manner, one or more non-contact sensor 24 measurements may be identified that correspond to the coordinates of the point sensor 50 measurement. Using data received from a point sensor 50, the processor 34 is configured to calibrate the stationary non-contact sensor 24 to provide a more accurate surface mapping of a blade 18 or 19. If the temperature measurement of the non-contact sensor 24 is not equal to, or not within a predetermined range of the temperature measurement taken by the point sensor 50, the non-contact sensor 24 is calibrated and the associated temperatures are adjusted accordingly. In a preferred embodiment, not only is the temperature measurement data received from the non-contact sensor 24, which has the same X, Y and Z coordinates as the point sensor 50 temperature data, is adjusted, but all temperature measurements across the thermal map may be adjusted.

With respect to Table I below there is listed non-calibrated data measurements according to data received from the non-contact sensors 24 and a point sensor 50 data measurement:

TABLE I

Non-Calibrated Data

| | Non-Contact Sensor Temperature Measurement | | | Point Sensor Temperature Measurement | | |
|---|---|---|---|---|---|---|
| | Temperature | Coordinates | Date/Time | Temperature | Coordinates | Date/Time |
| A | 620° C. | 29.0742, −30.2361, 0.000 | Jun. 9, 2010; 6:15:47 | | | |
| B | 622° C. | 58.7062, −55.2870, 19.000 | Jun. 9, 2010; 6:15:47 | 625° C. | 58.7062, −55.2870, 19.000 | Jun. 9, 2010; 6:15:47 |
| C | 621° C. | 63.0060, −64.8224, 76.000 | Jun. 9, 2010; 6:15:47 | | | |

As shown, the left half of Table I includes temperature measurements for each of the colored areas A, B and C of the thermal map and representative coordinates for each measurement. The right column includes a temperature measurement received from a point sensor 50, and the corresponding coordinates. In addition, data representative of the date and time that a measurement is taken may also be provided so that measurements from the point sensor 50 are compared to measurements from non-contact sensors 24 or 31. The processor 34 is programmed to compare the point sensor 50 temperature measurement or data to the non-contact sensor 24 temperature measurement data having corresponding X, Y and Z coordinates.

Table II below shows the temperature measurement data having been calibrated according to the point sensor 50 temperature measurement:

As shown in the above Table II, the data measurements for each of the areas A, B and C are calibrated according to the temperature measurement received from the point sensor 50.

The non-contact sensor 31 for detecting vibrational modes of a component may similarly be calibrated. That is, a three-dimensional surface map be generated from data received from the sensor 31 that provide measurement data relative to vibrational measurements across a surface of a component. In addition, a point sensor such as a strain gauge may be used to calibrate the surface area data. The data base 36 may contain data representing a profile of the component being monitored including a Cartesian coordinate system that provides an orientation of the component profile relative to a point or axis of rotation. For example, X, Y and Z coordinates of an airfoil profile for a blade 18, 19 or vane 22, 23 may be provided relative to a rotational axis of the shaft. An airfoil profile may be provided that represents a surface profile of the component at a static or non-operational condition, which may represent a map of origin from which to measure bending, twisting or elongation of the component.

During operation of the turbine machine, data received from the non-contact sensor 31 may used to generate a three-dimensional map or profile of the component. This profile may be compared to the original profile to determine an amplitude or magnitude of displacement of the defined region 62 of a component or with respect to certain coordinates within the defined regions 62. The data retrieved from the non-contact sensor 31 is compared to the point sensor 50 data for purposes of calibrating the non-contact sensor data.

Figure 5:
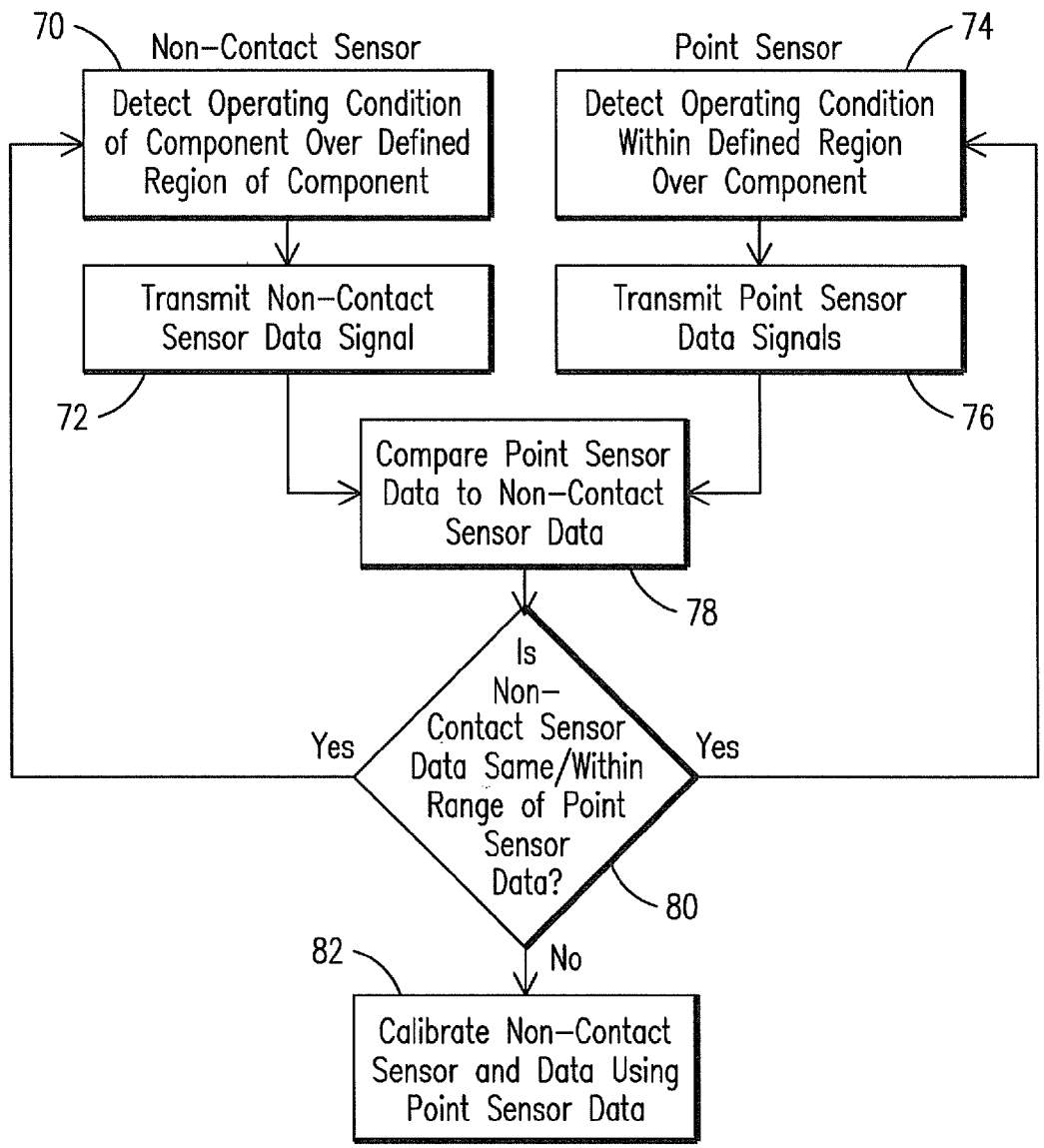
FIG. 5 is a process diagram illustrating steps in a method of monitoring operating conditions of components of a turbine machine.

FIG. 5 illustrates a flow chart or process diagram comprising steps in a method of monitoring operating conditions of components of a turbine machine. In step 70, a non-contact sensor detects an operating condition of a turbine machine, for example, an operating condition of a vane or blade in a compressor or turbine; and, transmits data signals representing surface area measurements of the detected. In step 72,

TABLE II

Calibrated Data

| | Non-Contact Sensor Temperature Measurement | | | Point Sensor Temperature Measurement | | |
|---|---|---|---|---|---|---|
| | Temperature | Coordinates | Date/Time | Temperature | Coordinates | Date/Time |
| 1 | 623° C. | 29.0742, −30.2361, 0.000 | Jun. 9, 2010; 6:15:47 | | | |
| 2 | 625° C. | 58.7062, −55.2870, 19.000 | Jun. 9, 2010; 6:15:47 | 625° C. | 58.7062, −55.2870, 19.000 | Jun. 9, 2010; 6:15:47 |
| 3 | 622° C. | 63.0060, −64.8224, 76.000 | Jun. 9, 2010; 6:15:47 | | | | data representing the measurements taken from a non-contact sensor is transmitted to a data acquisition and control system, as also described. In step 74, a point sensor 50 mounted on a turbine or compressor component detects the same operating condition as detected by the non-contact sensor 24, 31; and, in step 66 data representing the measurement taken by the point sensor 50 is transmitted to the data acquisition and control system.

In a preferred embodiment, the data acquisition and control system 30 is configured to record data relative to the date and/or time the measurements are taken from the non-contact sensors 24, 31 and the point sensors 50. In addition, the data acquisition and control systems may be programmed to identify coordinates representing a location of one or more measurements taken by the non-contact sensors 24, 31, and representing the measurement taken by a point sensor 50. Accordingly, in step 78 the measurement data relative to the non-contact sensors 24, 31 is compared to the point sensor 50 data, so that in the comparison step 80 data relevant in date, time and location for purposes of calibration of the non-contact sensors 24, 31 is compared.

To that end, in step 80, the data control system 30 compares the non-contact sensor measurement data to the point sensor measurement data. If the non-contact sensor measurement is not equal to or within a predetermined range of the point sensor measurement data, the non-contact sensor 24 or 31, and corresponding measurement data, is calibrated based on the corresponding point sensor 50 measurement data, as described in step 82. As described above, the non-contact sensors 24, 31 may take multiple condition measurements over a defined region, and each such measurement may be based on the calibration of the point sensor 50 measurement data and the corresponding non-contact sensor 24, 31 measurement data identified by the data control system 30. In this manner, a more accurate surface map of a monitored operating condition may be generated.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that that invention be limited only by the spirit and scope of the appended clams.

The invention claimed is:

1. A diagnostic system for monitoring operating conditions of components of a turbine machine, comprising:
   a non-contact area sensor, positioned relative to the turbine machine in spaced relation to a component of the turbine machine, that detects an operating condition of the turbine component, and the non-contact sensor monitoring a defined region of the component determined by a field of view of the sensor, and generates data signals representing the operating condition;
   at least one wireless point sensor mounted on the turbine component and positioned on the turbine component at predetermined coordinates relative to the component, wherein the point sensor monitors the same operating condition as the non-contact sensor and generates data or data signals representing the operating condition;
   wherein the non-contact sensor detects the operating condition within a first estimated range of accuracy and the point sensor detects the operating condition within a second estimated range of accuracy that is higher than the first estimated accuracy range;
   a data acquisition and processing controller linked in data communication with the non-contact sensor and the wireless point sensor, wherein the controller is configured to calibrate the non-contact sensor or data received from the non-contact sensor using the operating condition data from the wireless point sensor.

2. The diagnostic system of claim 1 wherein the wireless point sensor is positioned on the turbine component within, the field of view of the non-contact sensor and the defined region of the turbine component monitored by the non-contact sensor.

3. The diagnostic system of claim 1 wherein at least one of the wireless point sensors is positioned on the turbine component within the field of view of the non-contact sensor and, the defined region of the turbine component monitored by the non-contact sensor.

4. The diagnostic system of claim 1 wherein during operation of the turbine the component moves relative to the non-contact sensor and into and out of the field of view non-contact sensor.

5. The diagnostic system of claim 4 wherein the component is a rotary blade of the turbine machine which includes a plurality of turbine blades in a turbine stage that rotate about a rotary axis of the turbine machine.

6. The diagnostic system of claim 1 wherein the operating condition is a surface temperature, a vibrational mode and/or a strain of the component.

7. The diagnostic system of claim 1 wherein the operating condition is a strain on the component, chemical composition of a gas flow across the component, on the component, a gas velocity across the component, a gas pressure across the component, and/or wear or cracking of a component.

8. The diagnostic system of claim 2 wherein the non-contact sensor transmits data relative to a plurality of measurements of the operating condition over the defined region, wherein coordinates of one or more of these measurements are identified, and the data for at least one such measurement having identified coordinates that are the same as the coordinates of the point sensor, or within a predetermined range of the point sensor coordinates, is calibrated based on the point sensor data.

9. The diagnostic system of claim 1 wherein the data of a plurality of the non-contact sensor measurements are calibrated based on the calibration of the calibrated data of the one or more measurements from the non-contact sensor that have the same coordinates, or coordinates within a predetermined range of the point sensor coordinates.

10. The diagnostic system of claim 1 wherein the data acquisition and processing controller is configured online to provide real time measurements and data calibration and/or the data acquisition and process controller is configured to provide offline, post processing measurements and data calibration.

11. A diagnostic system for monitoring operating conditions of components of a turbine machine, comprising:
   a non-contact sensor, positioned relative to the turbine machine in spaced relation to a component of the turbine machine, that detects an operating condition of the turbine component, and the non-contact sensor monitoring a defined region of the component determined by a field of view of the non-contact sensor, and generates data signals representing the operating condition;
   at least one wireless point sensor mounted on the turbine component and positioned on the turbine at predetermined coordinates relative to the component and within the defined region monitored by the non-contact sensor, wherein the point sensor monitors the same operating condition as the non-contact sensor and generates data, signals representing the operating condition;

wherein the non-contact sensor provides low fidelity data or data signals relative to the data or data signals generated by the wireless point sensor, which provides high fidelity signals relative to the data or data signals generated by the non-contact sensor; and, a data acquisition and processing controller linked in data communication with the non-contact sensor and the wireless point sensor, wherein the controller is configured to calibrate the low fidelity data or data signals generated by the non-contact sensor relative to the high fidelity data, or data signals generated by the point sensor.

12. The diagnostic system of claim 11 wherein the data acquisition and processing controller comprises data relative to a turbine component profile including coordinates of the profile and coordinate data of the point sensor on the component, and the controller is configured to identify the coordinates of the operating condition data received from the non-contact sensor that is the same or within a predetermined range of the coordinate data of the point sensor for calibration of the low fidelity data or data signals received by the non-contact sensor.

13. The diagnostic system of claim 12 wherein operating condition data received from the non-contact sensor includes a plurality of measurements of the operation condition detected and over the defined region, and wherein the data associated with the data associated with the plurality of the measurements is calibrated based on the calibration of the operating condition having the same coordinates, or coordinates within predetermined range of the point sensor.

14. The diagnostic system of claim 11 wherein the turbine components including a plurality of components within a single stage of the turbine and the non-contact sensor detects the operating condition of the same one or same plurality of components within the turbine stage as representing the detected operation condition for each of the components within the stage.

15. The diagnostic system of claim 14 wherein the components are turbine or compressor vanes, and/or turbine or compressor rotating blades.

16. A diagnostic method for monitoring operating conditions of components of a turbine machine, comprising:

detecting, over a defined region of a component for a turbine machine, an operating condition relative to the component using at least one non-contact area sensor from a fixed position in spaced relation to the component;

detecting, with at least one wireless point sensor from at least one position on the component having predetermined coordinates on the component within the defined region, the same operating condition relative to the component;

generating low fidelity data or data signals from the non-contact area sensor, that are indicative of the operating condition;

generating high fidelity data or data signals, from the wireless point sensor, that are indicative of the same operating condition; and, processing, at a data acquisition and processing controller, the low fidelity data or data signals and high fidelity data and data signals to calibrate the low fidelity data and data signals relative to the high fidelity data and data signals.

17. The diagnostic method of claim 16 wherein the turbine machine comprises a plurality of stages and at each stage includes a plurality of like components that work in synchronization to perform a desired function for the operation of the turbine machine, the method further comprising:

detecting the operating condition on a plurality of the like components over a defined region of each such component, using one or more non-contact area sensors from one or more fixed positions relative to the components and in spaced relation to each component; and, detecting, using each wireless point sensor from a respective position having predetermined coordinates on one or more of the plurality of the components within the defined region, the same operating condition relative to the one or more components.

18. The diagnostic method of claim 17 wherein the step of detecting the operating condition at a point on the one or more like components includes detecting the operating condition on only one component.

19. The diagnostic method of claim 17 wherein the like components move relative to the fixed position from which the operating condition is detected.

20. The diagnostic method of claim 17 wherein the like components are stationary relative to the fixed position from which the operating condition is detected.

21. The diagnostic method of claim 17 wherein the step of detecting the operating condition at a point on the component includes detecting the operating condition on at least one component, but not all components.

22. The diagnostic method of claim 16 wherein the step of processing the data and data signals includes processing the low fidelity data indicative of the operating condition of one of the like components and the high fidelity data indicative of the same operating condition of another of the like components to calibrate the low fidelity data relative the high fidelity data.

23. The diagnostic method of claim 16 further comprising the steps:

identifying the coordinates of low fidelity data representing a measurement of the operating condition that has the same coordinates of, or coordinates within a predetermined range of the coordinates of the position from which the operating condition is detected for generating the high fidelity data; and, calibrating the low fidelity data at the identified coordinates relative to the high fidelity data.

24. The diagnostic method of claim 23 wherein the step of generating low fidelity of data representative of the operating condition comprises generating a plurality of measurements of the operating condition wherein the step of identifying the coordinates of the low fidelity data includes identifying the coordinates of at least one of the measurements of the operating condition and the step of calibrating the low fidelity data comprises calibrating the data representing a plurality of the measurements of the operating condition.

\* \* \* \* \*